United States Patent
Stoppelmann

(10) Patent No.: US 8,183,318 B2
(45) Date of Patent: May 22, 2012

(54) POLYAMIDE MOULDING COMPOUND, ESPECIALLY FOR PRODUCING MOULDED PARTS FOR DRINKING

(75) Inventor: Georg Stoppelmann, Bonaduz (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 12/740,520

(22) PCT Filed: Oct. 22, 2008

(86) PCT No.: PCT/CH2008/000444
§ 371 (c)(1),
(2), (4) Date: Apr. 29, 2010

(87) PCT Pub. No.: WO2009/055947
PCT Pub. Date: May 7, 2009

(65) Prior Publication Data
US 2010/0237271 A1    Sep. 23, 2010

(30) Foreign Application Priority Data
Oct. 30, 2007    (EP) ..................... 07119561

(51) Int. Cl.
*C08K 3/40* (2006.01)

(52) U.S. Cl. ..................................... 524/494

(58) Field of Classification Search .............. 524/494
See application file for complete search history.

(56) References Cited

U.S. PATENT DOCUMENTS

| | | | | |
|---|---|---|---|---|
| 5,068,289 A * | 11/1991 | George et al. | ............... | 525/179 |
| 5,250,604 A | 10/1993 | Moriwaki et al. | | |
| 6,511,724 B1 | 1/2003 | Siour et al. | | |
| 6,943,231 B2 * | 9/2005 | Buhler | ............... | 528/310 |
| 2003/0125481 A1 | 7/2003 | Tamura et al. | | |
| 2003/0235666 A1 | 12/2003 | Buhler | | |
| 2005/0067514 A1 | 3/2005 | Bolduan et al. | | |
| 2009/0171038 A1 * | 7/2009 | Steffner | ............... | 525/435 |
| 2010/0022742 A1 * | 1/2010 | Buhler et al. | ............... | 528/323 |

FOREIGN PATENT DOCUMENTS

| | | | |
|---|---|---|---|
| DE | 32 00 428 | A1 | 7/1983 |
| DE | 199 45 106 | A1 | 4/2001 |
| DE | 100 09 756 | A1 | 9/2001 |
| DE | 602 09 862 | T2 | 1/2007 |
| EP | 0 408 390 | A1 | 1/1991 |
| EP | 0 523 445 | A2 | 1/1993 |
| EP | 1 369 447 | A1 | 12/2003 |
| JP | 08-281804 | * | 10/1996 |
| WO | 2007/074086 | A1 | 7/2007 |
| WO | 2007/087896 | A1 | 8/2007 |

* cited by examiner

*Primary Examiner* — Peter Szekely
(74) *Attorney, Agent, or Firm* — Sughrue Mion, PLLC

(57) ABSTRACT

The invention relates to a polyamide molding compound consisting of the following constituents: (A) between 25 and 70 wt. % of an aliphatic polyamide selected from the group PA1010, PA1012, PA1014, PA1210, PA1212, PA1214, PA12 and PA11, or a mixture of at least two of said systems; (B) between 8 and 35 wt. % of a transparent polyamide selected from the group MACM9-36, MACM9-36/PACM9-36, MACMI/12, MACMI/MACMT/12, or a mixture of at least two of said systems; (C) between 10 and 60 wt. % of reinforcing materials; (D) between 0 and 30 wt. % of particulate and/or layered filling materials; and (E) between 0 and 5 wt. % of auxiliary materials and/or additives, the sum of the constituents (A)-(E) amounting to 100 wt. %. Fibers are used at least partially as reinforcing materials (C), the cross-sectional surface of the fibers being either circular or the dimensional ratio of the main cross-sectional axis to the secondary cross-sectional axis being below 2. The invention also relates to uses of such a polyamide molding compound and components at least partially produced using such a polyamide molding compound.

27 Claims, No Drawings

POLYAMIDE MOULDING COMPOUND, ESPECIALLY FOR PRODUCING MOULDED PARTS FOR DRINKING

TECHNICAL FIELD

The present invention relates to a polyamide-based molding material, especially for use in the drinking water sector, i.e. for producing moldings in which the processed molding material comes into contact with drinking water when used as intended.

STATE OF THE ART

Being our most important source of nourishment, drinking water must not suffer any inadmissible losses of quality until the point at which it is supplied to the consumer. Accordingly, the materials in the drinking water installation (consumable articles) are of particular importance. According to DIN 1988, all plant parts must be designed such that the drinking water quality is not impermissibly impaired.

The working group "Drinking Water Issues" of the Plastics Commission of the German Federal Health Institute (Bundesgesundheitsamt, BGA) is concerned with the health assessment of consumable articles made of plastics and other nonmetallic materials which are intended for use in the drinking water sector. The assessments are based on the BGA recommendations for plastics which come into contact with food. The result of this study provides the basis for "Recommendations for Plastics and Other Nonmetallic Materials which can be used in Drinking Water" (plastics/drinking water recommendations, abbreviated in German to KTW recommendations). They correspond in each case to the state of knowledge and technology.

When the starting materials are the subject of a KTW recommendation and the fabrication aids and additives meet the requirements made there in terms of type, amount and purity, compliance with the basic and additional requirements has to be demonstrated in the finished product (molding).

Specifically, the guideline for hygiene assessment of organic materials in contact with drinking water (KTW guideline, issued: May 16, 2007), as a specification of the warm water test at (60±2)° C. and of the hot water test at (85±2)° C. (performance of the migration test according to DIN EN 12873-1: 2004 and -2: 2005), the following method, which is an essential characterizing feature for the present invention:
a) There is no disinfection pretreatment (high chlorination) of the test specimens before the test.
b) The pretreatment is effected in the following sequence:
rinsing with tap water for 1 h,
stagnation with test water at the test temperature ((60±2)° C. or (85±2)° C.) for 24 h,
rinsing with tap water for 1 h,
rinsing off with test water.
c) The test water used is water according to 5.1.2 DIN EN 12873-1.
d) At least two identical contact tests and two blank tests are performed at the same time.
e) Pipes with an internal diameter of <80 mm are tested by filling. Pipes with a DN 80 internal diameter<300 mm are tested by inserting a glass cylinder at an S/V ratio (surface/volume ratio, where S is the surface area of the test specimen and V is the volume of the test water) of approx. 5 $dm^{-1}$. Pipes with an internal diameter of 300 mm can be tested by inserting a glass cylinder or by filling pipe segments at an S/V ratio of 5 $dm^{-1}$. Vessel coatings are tested as coated plates at an S/V ratio of approx. 5 $dm^{-1}$. Pieces of equipment and seals are tested by immersing the products at an S/V ratio of approx. 5 $dm^{-1}$.
f) When there is no difference in the material composition and in the production process for pipes, pieces of equipment and seals, it is sufficient to test at the smallest diameter of a product series.
g) The filling or immersion of the test specimens is effected with or in the test water at the test temperature. The test setups should be kept at this temperature in a heated cabinet or thermostat.
h) The pretreatment is followed by seven migration periods at the test temperature (cf. appendix 2 of the guideline: Scheme for performance of the migration tests at elevated temperatures). The test waters of the first three and of the last two test periods, with 24 hours of contact time each, are used for the further studies.
i) The TOC (total organic carbon) is determined as NPOC (nonpurgeable organic carbon) to DIN EN 1484 in the five migration samples.
j) The specific migration of individual substances is determined in the migration samples of the 1st, 6th and 7th periods.

An important additional requirement is the "carbon release" (migration rate) in contact with the drinking water. The guideline value in the 7th extraction of 12.5 mg $C/m^2d$ must not be exceeded. The carbon concentration underlying the migration rate, which is determined here, corresponds to the total concentration of dissolved organic carbon (total organic carbon or TOC for short) after the 7th extraction cycle.

In general, the amount of extractable material and hence the TOC rise with increasing temperature, such that different extract values are attained at 23° C. (cold water), 60° C. (warm water) and 85° C. (hot water) for the same polymeric material. For instance, some plastics have low TOCs which conform to KTW at room temperature, but high TOCs at 60 or 85° C., such that they are not approved for the warm and hot water sector.

US 2005/67514 A1 describes a corrugated tube which can consist of polyamide among other materials, and is intended for use for drinking water supply.

DE 19945106 A1 describes a pressure vessel which can also be installed in drinking water plants. The vessel is manufactured from polyamide in the so-called spin-casting process. PA6 is mentioned by way of example.

U.S. Pat. No. 6,511,724 describes a multilayer plastics conduit for drinking water supply, wherein the inner layer consists of PE and the outer layer of PA12. The PA12 layer is intended to prevent the diffusion of hydrocarbons from the soil into the drinking water. The fact that it is not possible to dispense with the PE inner layer, or there is no intention to do so, suggests that PA12 is unsuitable for drinking water supply.

SUMMARY OF THE INVENTION

It is accordingly an object of the invention to provide an improved molding material for producing a molding for drinking water, especially an improved molding material which can also be approved for drinking water at high temperature.

This object is achieved by providing a polyamide molding material composed of the following constituents:
(A) 25-70% by weight of aliphatic polyamide selected from the group of PA1010, PA1012, PA1014, PA1018, PA1210, PA1212, PA1214, PA1218, PA12 and PA11 or a mixture of two or more of these systems;
(B) 8-35% by weight of transparent polyamide selected from the group of MACM9-36, MACM9-36/PACM9-36, MACMI/12, MACMI/MACMT/12, or a mixture of two or more of these systems;
(C) 10-60% by weight of reinforcers;
(D) 0-30% by weight of particulate and/or layered fillers;

(E) 0-3% by weight of adjuvants and/or additives,
where the sum of components (A)-(E) adds up to 100% by weight, and
wherein the reinforcers (C) used are at least partly fibers which either have a circular cross-sectional area or in which the dimension ratio of the major cross-sectional axis to the minor cross-sectional axis is less than 2.

One significant element of the invention thus consists in the recognition that the proposed specific mixture can unexpectedly indeed have a very low TOC for high temperatures and can still be processed efficiently at the degrees of reinforcement specified (proportion of component C), even though comparatively inflexible fibers (essentially round or virtually round cross section) are used.

Component (A) is preferably PA11 or PA12, most preferably PA12.

Component (B) is preferably MACM12, MACM14, MACM16, MACM18, MACMI/12 or MACMI/MACMT/12, or a mixture of two or more of these systems.

In principle, though in connection with completely different applications, mixtures (blends) of different polyamides are obviously known from the prior art.

For example, DE 3200428 describes a glass fiber-reinforced molding material based on semicrystalline polyamides which contain 5-20% by weight, based on the overall molding material, of at least one amorphous transparent polyamide. The description and the examples mention only PA6 and PA66 as semicrystalline polyamides. The amorphous polyamides are based on TPS and trimethylhexamethylenediamine or IPS and HMDA or laurolactam, IPS and MACM. The aim is the improvement of the surface quality of reinforced moldings, and the use is stated merely in quite general terms that parts produced in the injection molding process should have a visually good surface. There is no indication to suitability for the drinking water sector.

DE 60209862 T2 describes a transparent composition comprising 5-40% by weight of an amorphous polyamide, 60-95% by weight of a semicrystalline polyamide and optionally polyamide elastomers, compatibilizers and flexible modifiers. In a preferred embodiment, the semicrystalline polyamide PA12 is mentioned, and the amorphous polyamide is based on the cycloaliphatic-diamine isophoronediamine. Since the articles claimed should be transparent, glass fibers are not mentioned as a possible component. The document relates to materials for ski coatings, there are no indications of the suitability of such moldings in the drinking water sector or the achievement of a low TOC.

DE 10009756 describes colorless transparent blends with improved stress cracking resistance, which, as well as the blend components, comprise at least one phosphorus compound. The polymer mixture consists of 1-99% of a transparent polyamide (A) and 99-1% of a semicrystalline polyamide (B). In a preferred composition range, 10-90% of the polyamide A and 90-10% of the polyamide B are mixed. Customary fillers and reinforcers can be added to the mixture. Use in the drinking water sector is not mentioned. The mixtures detailed in the examples contain only 30% by weight of semicrystalline polyamide.

EP 0 523 445 describes blends which contain 25-75% by weight of semicrystalline polyamide and 75-25% by weight of amorphous polyamide which necessarily contains dimerized fatty acid as a monomer. In addition to optional additives, it is also possible for customary fillers and reinforcers to be present in the molding material. PA12 as a semicrystalline polyamide is not mentioned, nor is use in the drinking water sector.

EP 0 408 390 relates to a thermoformable film based on semicrystalline and amorphous polyamides, wherein the mixtures contain 5-15% amorphous polyamides, preferably of the PA 6T/6I type. PA12 is not proposed as a semicrystalline polyamide.

US 2003/0125481 describes reinforced polyamide molding materials obtained by melt kneading of semicrystalline and semiaromatic amorphous polyamides and inorganic reinforcers. The crystallization temperature of the mixture should be below 180° C. The aromatic structural units in the amorphous polyamide are based on the following monomers: IPS, TPS, MXD. It is proposed that the molding material be used for production of exterior parts in the automotive sector, especially for rear view mirror housing.

U.S. Pat. No. 5,250,604 describes how the combination of good mechanical properties and good surface quality of reinforced polyamide molding materials, especially on absorption of water, is achieved by a polymeric matrix consisting of a mixture of an aliphatic, semicrystalline polyamide, of an aliphatic, semicrystalline copolyamide and of an amorphous polyamide.

None of these documents describes a polyamide molding material with the composition claimed, let alone the suitability of such a polyamide molding material for the sector of moldings in the drinking water sector, and the completely different uses in these documents cannot suggest such suitability either. More particularly, they cannot lead the person skilled in the art to suspect that such a molding material will be capable of achieving the outstandingly low TOCs for such applications.

PA12 as an example of component (A) alone meets the additional requirement with regard to the TOC for cold and warm water, but not for hot water. Only by the addition of amorphous or microcrystalline polyamides, preferably in the concentration range of 15-35 or 15-30% by weight, can the TOC be lowered to such an extent that it attains or goes below the required guide value. The amorphous or microcrystalline (common to these is transparency) polyamides used in component (B) themselves have a low TOC. The TOC reduction achieved significantly exceeds, in the selected concentration range, the values which arise theoretically from the mixing ratio of the components. The result is surprisingly that mixtures of PA12 and transparent polyamides meet the requirements for contact even with hot drinking water especially in the composition range of 62-85% (A)/38-15% (B).

Interestingly, the glass fiber content of reinforced molding materials exerts only a minor influence on the TOC of the individual extraction stages. In other words, it is not possible by addition of, for example, 50% by weight of glass fibers (component C) to halve the TOC. Instead, it is observed that the unreinforced and reinforced molding material have virtually identical TOCs, or that even the reinforced molding materials have the higher TOCs.

Blends in general composed of aliphatic, semicrystalline polyamides and transparent polyamides are, as discussed above, already substantially prior art. To date, however, it has not been shown or suggested that a mixture of the components of the specifically selected systems for A and B with the reinforcer C in the above-specified mixing ratio lead to molding materials with significantly reduced TOC. Nor has the use of such molding materials in the drinking water sector been mentioned even once to date. Nor do any known drinking water approvals exist for such blends.

The reinforcement (component C) can be effected with short fibers (e.g. chopped glass with a length of 2-50 mm) or endless fibers (long glass or rovings).

The glass fibers used in accordance with the invention as rovings (filler component C) have a diameter of 10 to 20 µm, preferably of 12 to 17 µm. The generally used term "diameter" is understood in the case of fibers with a noncircular, i.e. anisotropic, cross section, i.e. with a longer major cross-sectional axis than minor cross-sectional axis, hereinafter to mean the length of the major cross-sectional axis. The glass fibers used are preferably long glass fibers. More particularly, E glass fibers are used in accordance with the invention. In addition to the preferred E glass fibers, S glass fibers in particular are used, since they have a tensile strength which is 20-30% higher than the one of E glass fibers. However, it is also possible to use all other glass fiber types, for example A, C, D, M, R glass fibers or any mixtures thereof, or mixtures with E and/or S glass fibers.

In long fiber-reinforced molding materials, higher toughness and hence more metal-like properties are obtained when, instead of the customary endless glass fibers with a diameter of 15 to 19 μm, those with a diameter of 10 to 14 μm, especially those with a diameter of 10 to 12 μm, are used.

As mentioned, according to the invention, (glass) fibers which either have a circular cross-sectional area or in which the dimension ratio of the major cross-sectional axis to the minor cross-sectional axis is less than 2 are used. In other words, glass fibers or fibers in general which have an axis ratio of the cross-sectional area greater than or equal to 2 are explicitly ruled out.

In a preferred embodiment, the glass fibers used in accordance with the invention are short glass fibers with a diameter in the range from 7 to 20 μm, preferably 9 to 12 μm. The glass fibers are in the form of chopped glass with a length of 2 to 50 mm. More particularly, E and/or S glass fibers are used in accordance with the invention. However, it is also possible to use all other glass fiber types, for example A, C, D, M, R glass fibers or any mixtures thereof, or mixtures with E and/or S glass fibers. The sizes customary for polyamide are used, for example various aminosilane sizes, preference being given to high-temperature-stable sizes.

The inventive polyamide molding materials can be produced by the known processes for producing long fiber-reinforced pelletized material, especially by pultrusion processes, in which the endless fiber strand (roving) is completely impregnated with the polymer melt and then cooled and cut.

The endless carbon fibers used in the pultrusion process have a diameter of 5 to 10 μm, preferably 6 to 8 μm.

The long fiber-reinforced pelletized material obtained in this manner, which preferably has a pellet length of 3 to 25 mm, especially of 4 to 12 mm, can be processed further to moldings by the customary processing methods (for example injection molding, compression molding), particularly good properties of the molding being achieved with gentle processing methods. In this context, "gentle" means in particular that excessive fiber fracture and the associated significant reduction in the fiber length are substantially avoided. In injection molding, this means that screws of large diameter should be used.

Component (C) is preferably essentially, preferably essentially completely, formed from fiber selected from the group of: glass fibers, carbon fibers, boron fibers, aramid fibers, basalt fibers or mixtures thereof.

The investigations have shown that different glass fiber types contribute quite differently to the measured TOC of the molding material. Secondly, unreinforced molding materials tend to have lower TOCs compared to the glass fiber-reinforced molding materials with otherwise the same matrix composition. It is thus obvious to attribute an independent TOC (GF-TOC) to the glass fibers (GF). The GF-TOC was determined by subjecting the glass fibers themselves to the extraction cycle in place of the polyamide slab. In order to obtain a comparable and meaningful value for the customary test, an amount of glass fiber corresponding to the concentration in the reinforced polyamide slab was extracted (in the case of 50% reinforcement). The GF-TOC thus determined for the Bayer GF (glass fiber type A) is 45 mg C/d, whereas a TOC of 90 mg C/d is determined for the Vetrotex GF. The units are deliberately reported with omission of reference to the surface area, since the actual surface area of the glass fibers in this test does not exactly correspond to 1 m², and, moreover, the normalization to the surface area would be based on a different degree of reinforcement owing to the above considerations. On the basis of these findings, preference is given in accordance with the invention to using glass fibers with a GF-TOC less than 50 mg C/d.

In a preferred embodiment of the inventive polyamide molding material, component (C) is formed in the main, preferably essentially completely, of correspondingly configured glass fibers.

In a preferred embodiment of the polyamide molding material according to the invention, component (C) is present in the range of 15-55% by weight, preferably in the range of 25-55% by weight, especially preferably in the form of glass fibers.

In a further preferred embodiment of the polyamide molding material, the ratio of component (A) to component (B) in the polyamide molding material is in the range of 2-5, preferably in the range of 2.5-4. Expressed differently, it can be stated that component (A) is preferably present in the range of 30-60% by weight, preferably in the range of 30-50% by weight, and that component (B) is present in the range of 8-28% by weight, preferably in the range of 10-22% by weight.

In a particularly preferred embodiment, the concentration of the matrix, of the mixture of components (A), (B) and (E), is in the range of 45-85% by weight, whereas the reinforcers and fillers (components (C) and (D)) together are in the range from 15 to 55% by weight.

With regard to the properties of the later processing, it is found to be advantageous when the transparent polyamide (B) has a solution viscosity ($\eta_{rel}$) (0.5% by weight in m-cresol, 20° C.) between 1.3 and 2.0, especially preferably between 1.40 and 1.85, and/or has a glass transition temperature $T_g$ above 90° C., preferably above 110° C., especially preferably above 130° C. It is likewise found to be advantageous when the transparent polyamide (B) is a microcrystalline polyamide and/or copolyamide with an enthalpy of fusion in the range of 4-40 J/g, especially in the range of 4-25 J/g.

With regard to the microcrystalline polyamides of component (B), preference is given to a copolyamide of the MACM/PACM type, in each case with aliphatic dicarboxylic acids having 9 to 36 carbon atoms, especially having 10 to 18 carbon atoms, for example MACM12/PACM12, and preferably with a PACM concentration greater than 50 mol %, especially greater than 60 mol %. MACM represents the ISO name bis(4-amino-3-methylcyclohexyl)methane, which is commercially available under the trade name 3,3'-dimethyl-4,4'-diaminodicyclohexylmethane as Laromin C260 type (CAS No. 6864-37-5). The number after the name MACM in each case represents an aliphatic dicarboxylic acid (C12, e.g. DDA, dodecanedioic acid) with which the diamine MACM is polycondensed. PACM represents the ISO name bis(4-aminocyclohexyl)methane, which is commercially available under the trade name 4,4'-bisamino-dicyclohexylmethane as Dicycan type (CAS No. 1761-71-3). Suitable aliphatic dicarboxylic acids are azeleic acid, sebacic acid, undecanedioic acid, dodecanedioic acid, brassylic acid, tetradecanedioic acid, pentadecanedioic acid, hexadecanedioic acid, octadecanedioic acid and dimer acid having 36 carbon atoms.

The amorphous polyamides of component (B) are based on aliphatic and cycloaliphatic diamines, but exhibit zero or only a very low heat of fusion (measured by means of DSC). Preference is given to using amorphous polyamides of the MACMI/12 and MACMI/MACMT/12 composition, wherein the laurolactam content is in the range from 15 to 45 mol %, preferably less than 40 mol %, especially less than 35 mol %. In the copolyamide MACMI/MACMT/12, it is preferred when the concentration of isophthalic acid is greater than the concentration of terephthalic acid.

Particularly preferred transparent polyamides are: MACM12, MACM14, MACM18, PACM12/MACM12, MACMI/12.

Likewise with regard to processability, it is found to be advantageous when the aliphatic polyamide of component (A), especially when it is selected as PA12, has a solution viscosity (0.5% by weight in m-cresol, 20° C.) in the range of $\eta_{rel}$=1.5 to 3.0, preferably in the range of $\eta_{rel}$=n 1.6 to 2.6, especially in the range from 1.6 to 2.0. Particularly good properties of the polyamide molding material can be achieved when the aliphatic polyamide of component (A) up to a 50% by weight proportion of glass fibers has a solution viscosity (0.5% by weight in m-cresol, 20° C.) of $\eta_{rel}$=1.8 to 2.0, and for more highly reinforced molding materials has a solution viscosity of $\eta_{rel}$=1.6 to 1.8.

A further preferred embodiment of the polyamide molding material according to the invention is characterized in that the aliphatic polyamide of component (A), especially when selected as PA12, either has a balanced end group ratio or the carboxyl end groups are present in excess. In the latter case, the concentration of the amino end groups is preferably in the range from 5 to 70 mmol/kg, more preferably in the range from 5 to 50 mmol/kg and especially in the range from 5 to 30 mmol/kg. Generally, the concentration of the carboxyl end groups is preferably in the range from 50 to 150 mmol/kg, more preferably in the range from 60 to 120 mmol/kg and most preferably in the range from 60 to 90 mmol/kg.

As already mentioned above, the polyamide molding material proposed is especially characterized in that it, when processed to a molding, is suitable for the storage or delivery of drinking water at elevated temperature, preferably at temperatures more than 60° C. In this respect, it is thus notable specifically in that the total concentration of dissolved organic carbon in the seventh extraction does not exceed a value of 12.5 mg C/m$^2$d, which is determined by a process as outlined at the outset.

The polyamide molding material can, when adjusted correspondingly, in a further preferred embodiment, when processed to a molding, be designed for the storage or delivery of drinking water at temperatures above 80° C., preferably at temperatures above 85° C.±2° C. In this respect, it is notable specifically in that the total concentration of dissolved organic carbon in the seventh extraction does not exceed a value of 12.5 mg C/m$^2$d.

As a further result of the development studies, it has been found that the crosslinking of PA12 molding materials can likewise significantly reduce the TOC. However, crosslinking of, for example, PA12 alone is insufficient to achieve the required guide value for the TOC. In conjunction with radiation-induced crosslinking, however, the concentration of the transparent polyamide required (component B) can be lowered. In addition, it is expected that the heat distortion resistance of the moldings can be improved by the crosslinking. In other words, the moldings (pipes, fittings) are more resistant to mechanical influences, for example an increased internal pressure. The bursting pressure of a crosslinked pipe or fitting should be at a higher level, especially at high temperatures (hot water). The possibility of adding a crosslinking additive to the molding material and of crosslinking the finished moldings therefore likewise forms part of the subject matter of the application.

A further preferred embodiment consists correspondingly in, for the inventive use, at least partly crosslinking components (A) and/or (B) (and/or optionally even (E)), preferably by adding a crosslinking additive, especially preferably for radiation-induced crosslinking, which is preferably TAIC (triallyl isocyanurate) and more preferably TMPTMA (trimethylolpropane trimethacrylate) or TMPTA (trimethylolpropane triacrylate), especially in a proportion of in the range of 1-5%. Further suitable crosslinking additives are ethylene glycol dimethacrylate, ethylene glycol diacrylate and/or divinylbenzene. The systems may, for example, be as described in WO 2007/074086. With regard to the crosslinking and the additives usable therefor, the disclosure content of this document is explicitly incorporated into the present disclosure content. As a variant, the crosslinking, especially the radiation-induced crosslinking (e.g. electron beams, gamma rays), can also be effected without adding a crosslinking additive. The radiation dose used in accordance with the invention is greater than 50 kGy, preference being given to working with a dose between 60 and 125 kGy or between 60 and 100 kGy.

Radiation crosslinking with the aid of the crosslinking additive TAIC and/or TMPTMA (2% by weight based on the polyamide matrix) allows the TOC to be reduced significantly, even though a low molecular weight agent in TAIC is being added to the polyamide molding material. The crosslinking additive is added either during drum application of the crosslinking additive onto component A and/or B or the use of a master batch which comprises the crosslinking additive and is based on components A and/or B, or by metered addition of the pure or dissolved crosslinking additive in the course of compounding of components A to E.

Examples of preferred further reinforcers (component C) include other fibers (i.e. not glass fibers) such as carbon fibers (including graphite fibers), boron fibers, aramid fibers (p- or m-aramid fibers (e.g. Kevlar® or Nomex®, DuPont) or mixtures thereof) and basalt fibers, it being possible to use the reinforcing fibers mentioned as short or long fibers, or else in the form of a mixture of different fibers. These fibers may generally have any cross section. In a further alternative embodiment of the invention, the glass fibers used in accordance with the invention may be present in a mixture with carbon fibers (including graphite fibers). Exchanging a portion of the glass fibers for carbon fibers thus gives rise to a hybrid fiber-reinforced compound, the stiffness of which is increased compared to pure glass fibers. The mixture of glass and carbon fibers may have a weight ratio of glass fibers/carbon fibers of 70/30 to 97/3, especially of 80/20 to 95/5.

Optionally, further fillers (component D) can be added to the molding materials in amounts of 0 to 30% by weight. Component (D) may additionally comprise fillers, optionally in surface-treated form, selected from the following group: talc, mica, silicate, quartz, titanium dioxide, wollastonite, kaolin, amorphous silicas, magnesium carbonate, magnesium hydroxide, chalk, lime, feldspar, barium sulfate, solid or hollow glass beads or ground glass, especially ground glass fibers, permanently magnetic or magnetizable metal compounds and/or alloys, and mixtures of the elements from this group. Particularly preferred fillers are glass microbeads with a mean diameter in the range from to 100 µm, since these tend to impart isotropic properties to the molding and hence allow the production of moldings with low warpage.

As fillers, the inventive thermoplastic molding materials may thus preferably comprise one particulate filler or a mixture of two or more different fillers, also in combination with reinforcers.

Since any organic stabilization constitutes a possible carbon source with regard to the TOC determination according to the KTW guideline, relatively high concentrations of stabilizers have to be avoided. A maximum concentration of the stabilizing additives (component E) of 0.5% by weight, based on the polyamide matrix, is therefore preferably complied with. In order thus to ensure that no further undesired carbon sources are present in the polyamide molding material, it is found to be advantageous when the proportion of additives (E) is kept to a minimum, for example by virtue of the polyamide molding material comprising at most 0.5% by weight of component (E), i.e. of further additives, preferably stabilizing additives. Preferred stabilizers are phenol and/or phosphite compounds, for example Irganox 245, Irganox 1010, Irganox 1098, Hostanox PAR 24 or Irgafos 168. Particular preference is given to Irganox 1010 in a concentration of less than or equal to 0.5% by weight.

In the designation of component (B), transparency is generally understood to mean that the light transmission of a slab of thickness 2 mm produced from component (B) is at least 88%, preferably at least 90%, when the transmission is determined by means of a UV/VIS spectrometer at a wavelength of 600 nm.

The present invention further relates to a molding for delivering and/or storing drinking water, especially at elevated temperatures, preferably in the region of or above 80° C., produced from a polyamide molding material as characterized above. Such a molding may, for example, be an armature, a fitting, a housing, a mixer, a tap, a filter housing, a water meter and water meter components (bearing, propellor, pedestal), a valve and valve components (housing, shutoff ball, vane, cylinder), a cartridge, a pump and pump components (e.g. paddle wheels, impellers), a conduit or a vessel, or constituent or element thereof. In such a molding, typically at least one region, preferably in the form of a coating or of a section, is exposed essentially directly to the drinking water in the course of use as intended.

The present invention further relates to use of a polyamide molding material as described above for producing a molding, especially of a component for delivering and/or storing drinking water, especially at elevated temperatures, preferably in the region of or above 80° C., especially armature, fitting, housing, filter housing, tap, distributor, valve, valve component, cartridge, pump, pump component, line or vessel, or constituent or element thereof.

WAYS OF PERFORMING THE INVENTION

In the examples according to table 1, the materials specified below were used:

PA type A: nylon 12 ($\eta_{rel}$=1.88), EMS-CHEMIE AG, Switzerland
PA type B: polyamide MACMI/12 with $\eta_{rel}$=1.55, EMS-CHEMIE AG, Switzerland
PA type C: polyamide MACM12 with $\eta_{rel}$=1.74, EMS-CHEMIE AG, Switzerland
PA type D: polyamide MACMI/MACMT/12 with $\eta_{rel}$=1.55, EMS-CHEMIE AG, Switzerland
Irganox 1010: pentaerythritol tetrakis[3-(3,5-di-tert-butyl-4-hydroxyphenyl)propionate], antioxidant based on a sterically hindered phenol
Glass fibers type A: CS 7928, 4.5 mm long, 10 μm diameter, BAYER AG, Germany The molding materials of the compositions in table 1 were produced on a Werner and Pfleiderer ZSK 30 twin-shaft extruder. The pellets of types B to E are metered into the intake zone. The glass fiber is metered into the polymer melt via a side feeder three housing units upstream of the nozzle.

The housing temperature was set as an ascending profile up to 280° C. At 150 to 200 rpm, 10 kg of throughput was achieved. The pelletization was effected by means of underwater pelletization, i.e. hot cutting under water, in which the polymer melt is forced through a die and pelletized in a water stream by a rotating blade directly after leaving the die. After pelletization and drying at 100° C. for 24 h, the pellet properties were measured and the test specimens were produced.

The test specimens were produced on an Arburg injection molding machine, with the cylinder temperatures set from 220° C. to 280° C. and a set peripheral screw speed of 15 m/min. The mold temperature was selected to be 40-90° C.

The measurements were carried out according to the following standards and on the following test specimens.

Tensile modulus of elasticity: ISO 527 with a pulling speed of 1 mm/min, ISO tensile specimen, standard: ISO/CD 3167, A1 type, 170×20/10×4 mm, temperature 23° C.

Breaking strength and elongation at break: ISO 527 with a pulling speed of 5 mm/min for reinforced molding materials and with a pulling speed of 50 mm/min for unreinforced molding materials. ISO tensile specimen, standard: ISO/CD 3167, A1 type, 170×20/10×4 mm, temperature 23° C.

Charpy impact resistance: ISO 179/*eU, ISO test specimen, standard: ISO/CD 3167, B1 type, 80×10×4 mm, temperature 23° C., * 1=non-instrumented, 2=instrumented.

Charpy notched impact resistance: ISO 179/*eA, ISO test specimen, standard: ISO/CD 3167, B1 type, 80×10×4 mm, temperature 23° C., * 1=non-instrumented, 2=instrumented.

Glass transition temperature (Tg), enthalpy of fusion (ΔH): ISO standard 11357-1/-2, pellets.

Differential scanning calorimetry (DSC) was carried out with a heating rate of 20° C./min.

Relative viscosity: DIN EN ISO 307, in 0.5% by weight m-cresol solution, temperature 20° C.

MVR (melt volume rate): to ISO 1133 at 275° C. and a load of 5 kg.

Bursting pressure: a cylindrical injection molding closed on one side (internal diameter 27.2 mm; wall thickness: 4 mm) is filled with water, mounted in a bursting pressure test bench by means of a quick hydraulic coupling and subjected with a pressure rise of 10 bar/s to a bursting pressure test (short-term internal pressure stress until failure). The tables report the maximum pressure attained. The test specimens which had been subjected to water storage were subjected to the bursting pressure test immediately after the storage had ended.

TOC measurement, 7th migration: according to the guideline for hygiene assessment of organic materials in contact with drinking water (KTW guideline, issued: May 16, 2007), hot water test at (85±2)° C. (performance of the migration test according to DIN EN 12873-1: 2004 and -2: 2005); two identical contact and blank tests were performed in parallel in each case; the difference in the mean values of measured value and blank value gives the carbon concentration sought; the test specimens used were slabs with a surface area of 87.5 cm² which were each extracted with 350 ml of test water per migration test at an S/V ratio of 2.5 dm$^{-1}$; the TOC was determined by the NPOC method with the Shimadzu TOC-V CPH instrument.

Long-term internal pressure performance: was determined according to ISO 9080 on pipes with a diameter of 32 mm and a wall thickness of 3 mm at a temperature of 60° C. Gives the hydrostatic load that the tested tube can withstand at the test temperature over a duration of 50 years.

Unless stated otherwise in the table or description, the test specimens are used in the dry state. For this purpose, the test specimens are stored in a dry environment at room temperature for at least 48 h after the injection molding.

As examples E4 and E6 show, the bursting pressure of the inventive molding materials remains at a high level even after 2000 h of storage in hot water at 80 or 95° C. When, in E4, PA type A is exchanged for nylon 6,6 (CE2), this gives a higher bursting pressure before storage, but it falls significantly in

TABLE 1

Blends with GF reinforcement, CE = comparative example, not according to the invention, E = example according to the invention.

| Components | Unit | CE1 | E1 | E2 | E3 | E4 | E5 | E6 |
|---|---|---|---|---|---|---|---|---|
| PA type A | % by wt. | 44.80 | 39.80 | 37.32 | 34.82 | 37.32 | 37.32 | 34.82 |
| PA type B | % by wt. | | | | | 12.43 | | |
| PA type C | % by wt. | | 4.95 | 9.95 | 12.43 | 14.93 | | |
| PA type D | % by wt. | | | | | | 12.43 | 14.93 |
| IRGANOX 1010 | % by wt. | 0.25 | 0.25 | 0.25 | 0.25 | 0.25 | 0.25 | 0.25 |
| Glass fibers type A | % by wt. | 50.00 | 50.00 | 50.00 | 50.00 | 50.00 | 50.00 | 50.00 |
| Tensile modulus of elasticity | MPa | 11800 | 11860 | 11860 | 11890 | 12140 | 12240 | 12140 |
| Breaking strength | MPa | 150 | 154 | 152 | 152 | 156 | 168 | 168 |
| Elongation at break | % | 4.5 | 4.5 | 4.3 | 4.1 | 4.9 | 5.2 | 5 |
| Charpy impact resistance, 23° C. | kJ/m$^2$ | 95 | 92 | 92 | 83 | 98 | 89 | 82 |
| Charpy notched impact resistance, 23° C. | kJ/m$^2$ | 25 | 25 | 25 | 26 | 25 | 17 | 18 |
| Bursting pressure | bar | 270 | 275 | 280 | 290 | 280 | 290 | 300 |
| Bursting pressure after storage for 2000 h, 23° C. | bar | — | — | — | — | 250 | — | 260 |
| Bursting pressure after storage for 2000 h, 80° C. | bar | — | — | — | — | 235 | — | 240 |
| Bursting pressure after storage for 2000 h, 95° C. | bar | — | — | — | — | 230 | — | 240 |
| TOC 7th migration | mg C/m$^2$d | 22 | 12 | 9 | 6 | 9 | 9 | 6 |

Comparative example CE2

| Composition | | |
|---|---|---|
| N6,6 | % by wt. | 37.32 |
| Polyamide type B | % by wt. | 12.43 |
| Irganox 1010 | % by wt. | 0.25 |
| Glass fibers type A | % by wt. | 50.00 |
| Bursting pressure | | |
| Before storage | bar | 350 |
| After storage for 2000 h, 23° C. | bar | 270 |
| After storage for 2000 h, 80° C. | bar | 195 |
| After storage for 2000 h, 95° C. | bar | 180 | the course of water storage, especially in the course of hot water storage.

TABLE 2

Crosslinked moldings (tensile and impact bars, cylinder for bursting pressure test and slabs) based on blends with GF reinforcement, CE = comparative example, not according to the invention, E = example according to the invention.

| Components | Unit | CE3 | CE4 | E7 | E8 | E9 |
|---|---|---|---|---|---|---|
| PA type A | % by wt. | 49.75 | 48.75 | 38.80 | 67.80 | 66.40 |
| PA type C | % by wt. | 0 | 0 | 9.95 | 16.95 | 16.65 |

TABLE 2-continued

Crosslinked moldings (tensile and impact bars, cylinder for bursting pressure test and slabs) based on blends with GF reinforcement, CE = comparative example, not according to the invention, E = example according to the invention.

| Components | Unit | CE3 | CE4 | E7 | E8 | E9 |
|---|---|---|---|---|---|---|
| TAIC | % by wt. | 0 | 1.00 | 1.00 | 0 | 1.7 |
| IRGANOX 1010 | % by wt. | 0.25 | 0.25 | 0.25 | 0.25 | 0.25 |
| Glass fibers type A | % by wt. | 50.00 | 50.00 | 50.00 | 15.00 | 15.00 |
| Tensile modulus of elasticity | MPa | 11800 | 11950 | 12000 | 3150 | 3050 |
| Breaking strength | MPa | 149 | 155 | 157 | 75 | 95 |
| Elongation at break | % | 5.2 | 3.4 | 3.3 | 12 | 8 |
| Bursting pressure | bar | 260 | 270 | 285 | — | — |
| TOC 7th migration | mg C/m$^2$d | 45 | 18 | 6 | 12 | 7 |
| Long-term internal pressure performance test stress | N/mm$^2$ | — | — | — | 5.3 | 14.2 |

The moldings produced from the molding materials of comparative example CE4 and of examples E7 and E9 were crosslinked by irradiation with electrons (dose: 66 kGy).

The migration rate (TOC) can be reduced significantly by crosslinking. However, crosslinking of the N12 matrix alone is insufficient to achieve the required low migration rate. This is demonstrated by comparative examples CE3 and CE4. Only the combination of crosslinking and addition of transparent polyamide solves the stated problem with regard to the TOC. However, low migration values are already achieved with a lower concentration of transparent polyamide in the crosslinked moldings. This is shown by a comparison of examples E1 and E7. With the same proportion of transparent polyamide (PA type D), the uncrosslinked molding material (E1) has a TOC in the 7th migration of 12 mg C/m$^2$ d, whereas the migration rate for the crosslinked molding material (E7) is only 6 mg C/m$^2$ d, i.e. the migration rate is halved by crosslinking.

A comparison of examples E8 and E9 shows that crosslinking of the inventive moldings significantly improved the long-term performance under internal pressure stress; it was possible to more than double the test stress.

The invention claimed is:

1. A polyamide molding material composed of the following constituents:
   (A) 30-50% by weight of aliphatic polyamide selected from the group of PA1010, PA1012, PA1014, PA1018, PA1210, PA1212, PA1214, PA1218, PA12 and PA11 or a mixture of two or more of these systems;
   (B) 8-28% by weight of transparent polyamide selected from the group of MACM9-36, MACM9-36/PACM9-36, MACMI/12, MACMI/MACMT/12, or a mixture of two or more of these systems;
   (C) 25-60% by weight of reinforcers in the form of glass fibres;
   (D) 0-30% by weight of particulate and/or layered fillers;
   (E) 0-3% by weight of adjuvants and/or additives,
   where the sum of components (A)-(E) adds up to 100% by weight, and
   wherein the reinforcers (C) used are at least partly fibers which either have a circular cross-sectional area or in which the dimension ratio of the major cross-sectional axis to the minor cross-sectional axis is less than 2,
   wherein the ratio of component (A) to component (B) in the polyamide molding material is in the range of 2.5-4.

2. The polyamide molding material as claimed in claim 1, wherein component (A) is PA12.

3. The polyamide molding material as claimed in claim 1, wherein component (B) is MACM12, MACM14, MACM16, MACM18, MACMI/12 or MACMI/MACMT/12, or is a mixture of two or more of these systems.

4. The polyamide molding material as claimed in claim 1, wherein the fibers of component (C) are selected from the group of: glass fibers, carbon fibers, boron fibers, aramid fibers, basalt fibers or mixtures of such fibers.

5. The polyamide molding material as claimed in claim 1, wherein component (C) is formed mainly from correspondingly configured glass fibers.

6. The polyamide molding material as claimed in claim 1, wherein the transparent polyamide (B) has a solution viscosity ($\eta_{rel}$) between 1.3 and 2.0, and/or a glass transition temperature Tg above 90° C.

7. The polyamide molding material as claimed in claim 1, wherein the transparent polyamide (B) is a microcrystalline polyamide and/or copolyamide with an enthalpy of fusion in the range of 4-40 J/g.

8. The polyamide molding material as claimed in claim 1, wherein the polyamide of component (A), selected as PA12, has a solution viscosity in the range of $\eta$re=1.5 to 3.0.

9. The polyamide molding material as claimed in claim 1, wherein the polyamide of component (A), selected as PA12, up to a 50% by weight proportion of glass fibers has a solution viscosity of $\eta$rel=1.8 to 2.0, and for more highly reinforced molding materials has a solution viscosity of $\eta$rel=1.6 to 1.8.

10. The polyamide molding material as claimed in claim 1, wherein the polyamide of component (A), selected as PA12, either has a balanced end group ratio or the carboxyl end groups are present in excess, wherein the concentration of the amino end groups is in the range from 5 to 70 mmol/kg, and/or wherein the concentration of the carboxyl end groups is in the range from 50 to 150 mmol/kg.

11. The polyamide molding material as claimed in claim 1, wherein the sum of components (A), (B) and (E) is in the range of 45-85% by weight, whereas the sum of components (C) and (D) is in the range from 15 to 55% by weight.

12. The polyamide molding material as claimed in claim 1, wherein component (C) is present in the range of 25-55% by weight and in the form of glass fibers.

13. The polyamide molding material as claimed in claim 1, wherein the polyamide molding material, when processed to a molding, is designed for the storage or delivery of drinking water at temperatures of more than 60° C., in which case the total concentration of dissolved organic carbon in the seventh extraction does not exceed a value of 12.5 mg C/m2d.

14. The polyamide molding material as claimed in claim 1, wherein the polyamide molding material, when processed to a molding, is designed for the storage or delivery of drinking water at temperatures of more than 85° C.±2° C., in which case the total concentration of dissolved organic carbon in the seventh extraction does not exceed a value of 12.5 mg C/m2d.

15. The polyamide molding material as claimed in claim 1, wherein the mixture of components (A) and (B) is at least partly cross-linked, with or without addition of a crosslinking additive.

16. The polyamide molding material as claimed in claim 1, wherein component (D) comprises fillers, optionally in surface-treated form, selected from the following group: talc, mica, silicate, quartz, titanium dioxide, wollastonite, kaolin, amorphous silicas, magnesium carbonate, magnesium hydroxide, chalk, lime, feldspar, barium sulfate, solid or hollow glass beads or ground glass, especially ground flat glass fibers, permanently magnetic or magnetizable metal compounds and/or alloys, and mixtures of the elements from this group.

17. The polyamide molding material as claimed in claim 1, wherein the proportion of component (E) adds up to at most 1.0% by weight.

18. The polyamide molding material as claimed in claim 1, wherein the light transmission, determined at a wavelength of 600 nm, of a slab of thickness 2 mm produced from component (B) is at least 88%.

19. Method of using a polyamide molding material as claimed in claim 1 for producing a molding, in the form of a component for delivering and/or storing drinking water, at elevated temperatures, in the region of or above 80° C.

20. The polyamide molding material as claimed in claim 1, wherein component (C) is formed essentially completely, from correspondingly configured glass fibers.

21. The polyamide molding material as claimed in claim 1, wherein the ratio of component (A) to component (B) in the polyamide molding material is in the range of 2.5-4.

22. The polyamide molding material as claimed in claim 1, wherein the mixture of components (A) and (B) is at least partly cross-linked, with or without addition of a crosslinking additive, with radiation-induced crosslinking, wherein the crosslinking additive is triallyl isocyanurate (TAIC) and/or trimethylolpropane trimethacrylate (TMPTMA) and/or trimethylolpropane triacrylate (TMPTA), in a proportion in the range of 1-5%.

23. A molding for delivery and/or storage of drinking water, at elevated temperatures, in the region of or above 80° C., in the form of an armature, fitting, housing, mixer, tap, filter housing, water meter, water meter component, valve, valve component, distributor, cartridge, pump, pump component, conduit or vessel, or constituent or element thereof, produced using a molding material as claimed in claim 1.

24. Method of using a polyamide molding material as claimed in claim 1 for producing a molding, in the form of a component for delivering and/or storing drinking water, at elevated temperatures, in the region of or above 80° C., in the form of an armature, fitting, housing, mixer, tap, filter housing, water meter, water meter component, valve, valve component, distributor, cartridge, pump, pump component, conduit or vessel, or constituent or element thereof.

25. A molding for delivery and/or storage of drinking water, at elevated temperatures, in the region of or above 80 degrees Celsius, produced using a molding material as claimed in any of claims 1-5, 6-10, 11-18 and 20-22.

26. The molding as claimed in claim 25, wherein at least one region is exposed essentially directly to the drinking water when used as intended.

27. The molding as claimed in claim 25, wherein as least one region, in the form of a coating or of a section, is exposed essentially directly to the drinking water when used as intended.

* * * * *